(12) United States Patent
Su et al.

(10) Patent No.: US 7,415,089 B2
(45) Date of Patent: Aug. 19, 2008

(54) HIGH-SPEED SERIAL LINK CLOCK AND DATA RECOVERY

(75) Inventors: Chau-chin Su, Hsinchu (TW);
Chien-Hsi Lee, Hsinchu (TW);
Hung-Wen Lu, Hsinchu (TW);
Hsueh-Chin Lin, Hsinchu (TW);
Yen-Pin Tseng, Hsinchu (TW);
Chia-Nan Wang, Hsinchu (TW);
Uan-Jiun Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 659 days.

(21) Appl. No.: 10/800,653

(22) Filed: Mar. 16, 2004

(65) Prior Publication Data

US 2005/0207520 A1    Sep. 22, 2005

(51) Int. Cl.
*H04L 7/00* (2006.01)
(52) U.S. Cl. ........................... 375/355; 375/360
(58) Field of Classification Search ............... 375/373, 375/374, 375, 376, 355, 326, 327, 371, 362, 375/360; 327/156, 147; 331/25; 341/143
See application file for complete search history.

(56) References Cited

U.S. PATENT DOCUMENTS

| 4,287,596 | A |   | 9/1981 | Chari |   |
|---|---|---|---|---|---|
| 5,850,422 | A | * | 12/1998 | Chen | ......................... 375/371 |
| 6,055,021 | A |   | 4/2000 | Twitchell |   |
| 6,269,137 | B1 |   | 7/2001 | Colella et al. |   |
| 6,584,163 | B1 | * | 6/2003 | Myers et al. | ................ 375/360 |
| 6,760,389 | B1 | * | 7/2004 | Mukherjee et al. | .......... 375/326 |
| 7,069,481 | B2 | * | 6/2006 | Lee et al. | .................... 714/707 |
| 7,113,560 | B1 | * | 9/2006 | Huang et al. | ................ 375/355 |
| 7,149,269 | B2 | * | 12/2006 | Cranford et al. | ............ 375/373 |
| 7,200,782 | B2 | * | 4/2007 | Vining | ........................ 714/700 |
| 2003/0061564 | A1 | * | 3/2003 | Maddux | ..................... 714/798 |
| 2003/0142773 | A1 | * | 7/2003 | Shirota et al. | ............... 375/373 |
| 2004/0022196 | A1 | * | 2/2004 | Rivoir | ........................ 370/241 |
| 2004/0208270 | A1 | * | 10/2004 | Schmatz et al. | ............. 375/355 |

OTHER PUBLICATIONS

M.-J Edward Lee, William J. Dally, John W. Poulton, Patrick Chiang, Stephen F. Greenwood, An 84-mW 4-Gb/s Clock and Data Recovery Circuit for Serial Link Applications, VLSI Circuits Symposium, Kyoto, Japan, Jun. 2001.*

Dong-Hee Kim, Jin-Ku Kang, Clock and data recovery circuit with two exclusive-OR phase frequency detector, Electronic Letters, vol. 36, No. 16, 1347-1349, Aug. 3, 2000.*

* cited by examiner

*Primary Examiner*—Chieh M. Fan
*Assistant Examiner*—Aristocratis Fotakis
(74) *Attorney, Agent, or Firm*—Finnegan, Henderson, Farabow, Garrett & Dunner LLP (57) ABSTRACT

A system for clock and data recovery ("CDR") includes a clock generator, a half-rate phase detector for receiving the input data, an encoder, a phase selector outputting recovered clock, a confidence counter, and a multiplexer outputting recovered data. The clock generator generates an 8-phase clock signal at half a rate of the transmitted serial data. The phase detector samples input data at four times the standard sampling rate, takes the oversampled data and detects phase transitions therein, i.e., phase lead and lag. The encoder encodes the phase transition data. The confidence counter receives the phase transition data and generates a signal representing the accumulated net effect of the phase transitions. The phase selector receives the confidence counter signal and the 8-phase clock from the clock generator, and determines the optimum phase for data sampling.

23 Claims, 9 Drawing Sheets

▲ State Diagram

Fig. 8

Up/Down Phase Selector

▸ State Diagram

*Initial State $S_{ini} = S_0$*

| System State | $S_0$ | $S_1$ | $S_2$ | $S_3$ |
|---|---|---|---|---|
| Optimum Phase | $T_0$ | $T_1$ | $T_2$ | $T_3$ |
| Sampling Phases | $P_0, P_4$ | $P_1, P_5$ | $P_2, P_6$ | $P_3, P_7$ |
| O_Sel | 0 | 1 | 0 | 1 |

Fig. 9

HIGH-SPEED SERIAL LINK CLOCK AND DATA RECOVERY

BACKGROUND OF THE INVENTION

1. Field of the Invention

The present invention generally relates to data processing systems and, more particularly, to the transmission of data over a serial line or link between two subsystems of a data processing system.

2. Description of the Related Art

Communications networks can provide high bit-rate transport over a shared medium with a serial line or link, such as passive optical networks, cable television networks (fiber, coaxial or hybrid), digital television, and wireless networks. These shared-medium networks typically use time, frequency or code division multiplexing to transport data signals from a central terminal to several remote customer terminals and time division multiple access (TDMA) to transport data signals from the customer terminals to the central terminal. TDMA is characterized by noncontinuous or burst mode data transmission.

Traditional clock and data recovery ("CDR") methods are provided for communications systems receiving continuous data streams that have enriched spectra at the sampling frequency. CDR is a useful functionality in high-speed transceivers in the art. Such transceivers serve a plurality of applications, e.g., optical communications, backplane data routing, and chip-to-chip interconnects. The data received therein are asynchronous and noisy, thus requiring that a clock be extracted for allowing synchronous operations. The data also need to be retimed so that jitter accumulated during data transmission can be removed.

A phase locked loop ("PLL") can be used in clock and data recovery in phase tracking for data being transmitted. A phase detector compares the lead or lag of phases between a voltage controlled oscillator (VCO) clock and the input data. The comparison result is filtered by a loop filter for filtering out high frequency noise and data jitter that can adversely affect the stability of the VCO clock. The loop filter outputs a control voltage for the VCO for aligning the rising edges of the input data. When the PLL is locked, the data can be extracted from the phase detector accordingly. The PLL, however, may have problems tracking high frequency phase jitter in high-speed data recovery systems.

In the case of noncontinuous data transmission, i.e., burst mode transmission, multi-rate oversampling with a long preamble may be required for data recovery. Such processing approaches in data transmission are disadvantageous because of their excessive power consumption and inefficient utilization of bandwidth over the communications link. Moreover, conventional CDR methods are not suited for making fast data recovery decisions.

There is thus a general need in the art for a system and method overcoming at least the aforementioned shortcomings in the art. A particular need exists in the art for a system and method overcoming disadvantages with respect to excessive power consumption and inefficient bandwidth use and difficulty in making fast data recovery decisions over a serial communications link.

BRIEF SUMMARY OF THE INVENTION

Accordingly, an embodiment of the present invention is directed to a system and method with clock and data recovery ("CDR") that obviate one or more of the problems due to limitations and disadvantages of the related art.

To achieve these and other advantages, and in accordance with the purpose of the present invention as embodied and broadly described, there is provided a system comprising a clock for generating a clock signal at half a rate of transmitted serial data; a half-rate phase detector for oversampling transmitted serial data and providing sampled data, and for detecting phase transitions between a phase lead and a phase lag in the sampled data and output phase transition data; an encoder for encoding the phase transition data; a confidence counter coupled to receive the phase transition data and provide an output representative of an accumulated effect of the phase transitions; and a phase selector, coupled to receive the clock signal and the output from the confidence counter, for selecting an optimum phase effective for recovering the clock relative to the transmitted serial data.

Also in accordance with the present invention, there is provided a clock and data recovery ("CDR") method comprising generating a clock signal at half a rate of transmitted serial data, oversampling the transmitted serial data and providing sampled data, detecting phase transitions between a phase lead and a phase lag in the sampled data and outputting phase transition data, encoding the phase transition data, providing an output representative of an accumulated effect of the phase transitions, and selecting an optimum phase effective for recovering the clock relative to the transmitted serial data.

Additional features and advantages of the present invention will be set forth in part in the description which follows, and in part will be obvious from the description, or may be learned by practice of the present invention. The features and advantages of the present invention will be realized and attained by means of the elements and combinations particularly pointed out in the appended claims.

It is to be understood that both the foregoing general description and the following detailed description are exemplary and explanatory only and are not restrictive of the present invention, as claimed.

The accompanying drawings, which are incorporated in and constitute a part of this specification, illustrate several embodiments of the present invention and together with the description, serve to explain the principles of the present invention.

BRIEF DESCRIPTION OF THE DRAWINGS

FIGS. 3A-3E and 4A-4E are diagrams that illustrate examples of oversampling at non-transition phases according to further embodiments of the present invention;

DESCRIPTION OF THE EMBODIMENTS

Reference will now be made in detail to present embodiments of the present invention, examples of which are illustrated in the accompanying drawings. Wherever possible, the same reference numbers will be used throughout the drawings to refer to the same or like parts.

Figure 1:
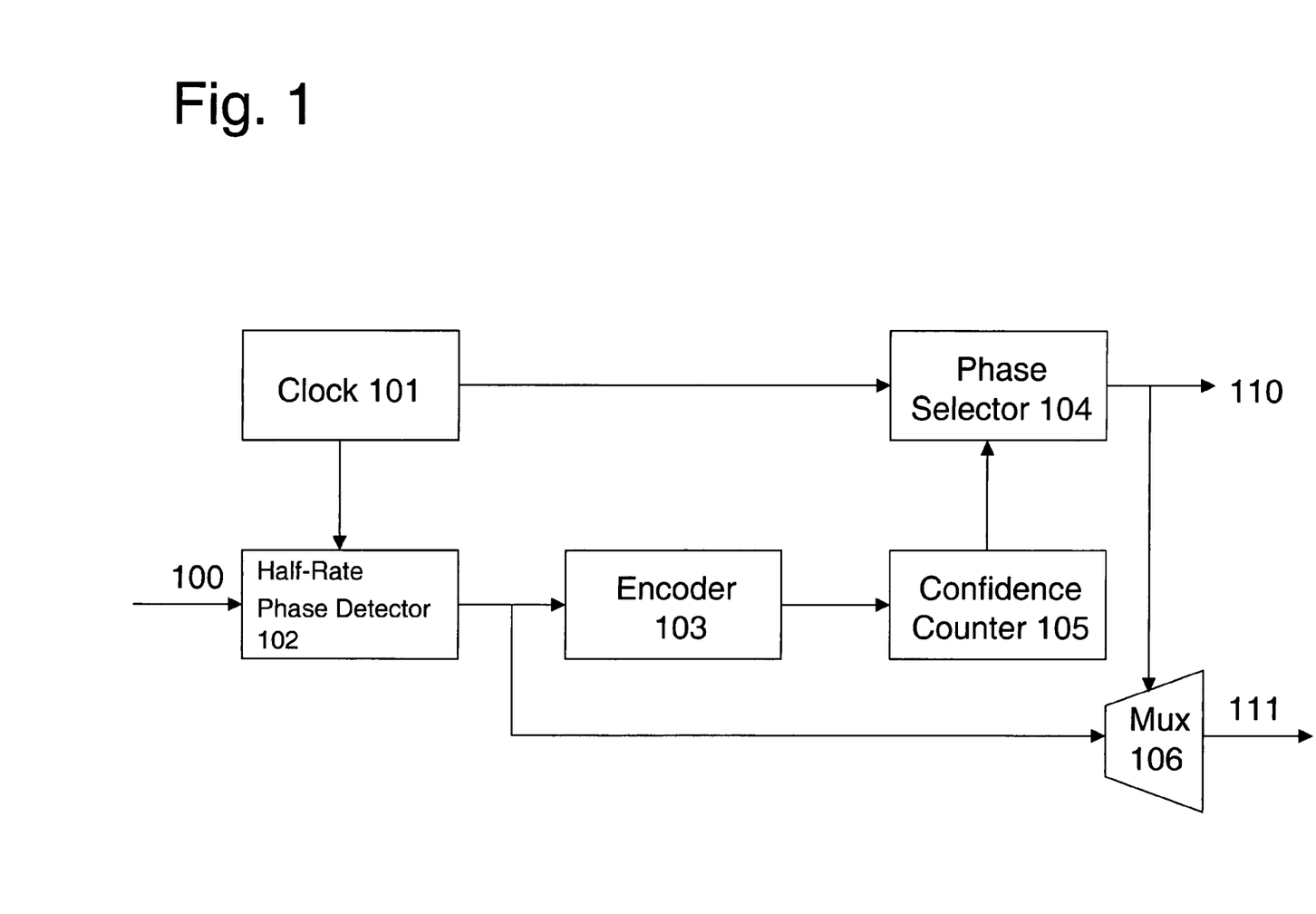
FIG. 1 is a block diagram that illustrates an example of a system according to one embodiment of the present invention.

FIG. 1 is a block diagram of a system for clock and data recovery ("CDR") according to one embodiment of the present invention. The system comprises a clock generator 101, a half-rate phase detector 102 receiving input data 100, an encoder 103, a phase selector 104 outputting a recovered clock 110, a confidence counter 105, and a multiplexer 106 outputting recovered data 111.

Based on a reference clock, clock generator 101 generates an 8-phase clock signal for input data 100 at half of the input data rate. The clock signal includes 8 phases for each clock period. A delay locked loop ("DLL") or phase locked loop ("PLL") device can serve as an 8-phase clock of clock generator 101. A crystal oscillator generates a reference clock. Based on the half-rate, 8-phase clock generated by clock generator 101, half-rate phase detector (HRPD) 102 samples input data 100 at four times a standard sampling rate (i.e., 4×oversampling). For 4×oversampling, a single bit of input data 100 is sampled at four different temporal points within that bit. With logic operations in HRPD 102, such as exclusive-or ("XOR") logic operations, transitions for the eight phases in the clock signal are detected. Encoder 103 receives the oversampled data and detected phase transitions from HRPD 102 and encodes them based on phase transitions therein, i.e., phase lead and lag between optimum and current sampling phases, and outputs corresponding phase transition data. Confidence counter 105 receives the phase transition data and generates a signal representing the accumulated net effect of the phase lead and lag transitions. Phase selector 104 receives the signal generated by confidence counter 105, along with the 8-phase clock from clock generator 101, and determines the optimum phase for data sampling. Phase selector 104 outputs a recovered clock signal based on the optimum clock signal phase for the data sampling. Mux 106 receives recovered clock 110 from phase selector 104 and the oversampled data from HRPD 102 and outputs recovered data 111.

Embodiments consistent with the present invention can include a clock and data recovery ("CDR") method comprising transmitting data over a serial link, generating a half clock that is half of a data rate of the transmitted data, oversampling the transmitted data, selecting two phases wherein the selected phases are generally 180 degrees out of phase, detecting a phase lead and a phase lag from the selected phases, selecting a sampling phase by referencing the detected phase lead and the detected phase lag, and selecting an optimum phase for recovering the clock.

In one aspect, the CDR method further comprises oversampling the transmitted data at four times the half clock. In another aspect, the generated clock is an 8-phase clock. In yet another aspect, the CDR method further comprises multiplexing recovered clock and the oversampled data for outputting the transmitted data. In a further aspect, the CDR method further comprises encoding the detected phase lead and phase lag for selecting the optimum phase.

In an additional aspect, a state machine is implemented in confidence counter 105 for referencing the phase lead and the phase lag. In yet an additional aspect, the state machine further comprising an initial state and eight states for each of the phase lead and the phase lag. In a further aspect, the CDR method further comprises shifting the sampling phase toward the optimum phase using a state machine having eight phases.

Figure 2A:
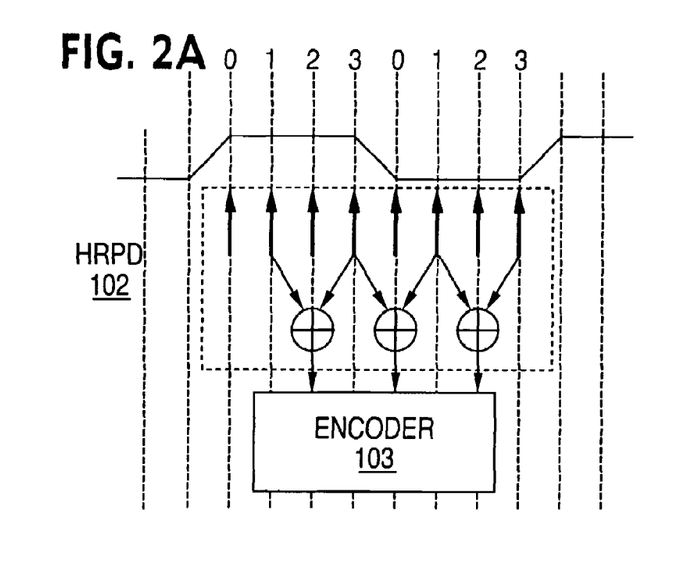
FIGS. 2A, 2B, 2C, 2D and 2E are diagrams that illustrate examples of oversampling with an 8-phase clock according to one embodiment of the present invention.
Figure 2B:
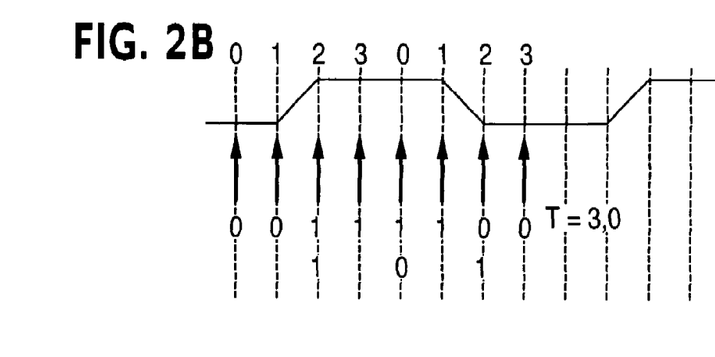
Figure 2C:
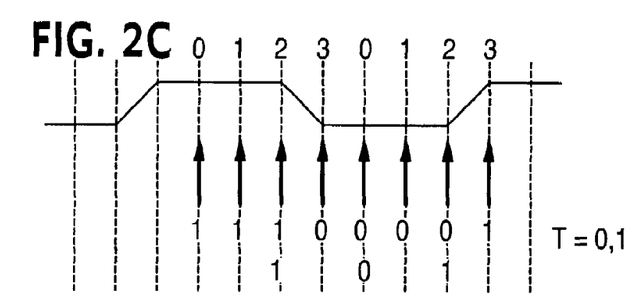
Figure 2D:
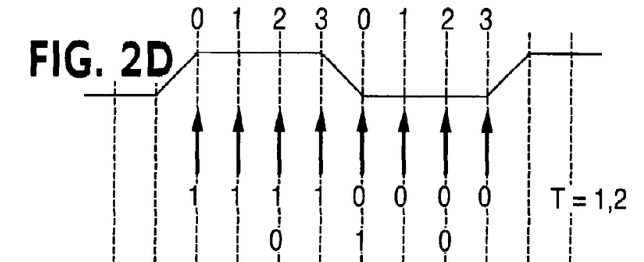
Figure 2E:
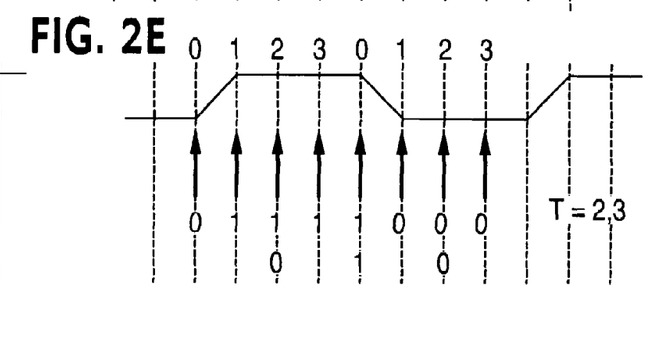

FIGS. 2A, 2B, 2C, 2D and 2E are diagrams that illustrate examples of 4× oversampling performed by HRPD 102 with the 8-phase clock. With the oversampling, phase transition data can be obtained by a logic operation such as XOR (exclusive-OR) in the HRPD 102. Encoder 103 encodes the phase transition data. An optimum phase T for data sampling can be determined. Referring to FIG. 2A specifically, the input data with the 8-phase clock will include samples at phases 0, 1, 2, 3, 0, 1, 2, 3, of two successive 4× oversamples, which are then subject to XOR logic operations in HRPD 102. A single set of oversampled data will be output to encoder 103. For purposes of logic operations, 1 signifies a transition, whereas 0 signifies no transition. With reference to FIG. 2B specifically, at T=(3, 0), oversampled data 0, 0, 1, 1, 1, 1, 0, 0 yield phase transition data 101 after logic operations in the HRPD 102. With reference to FIG. 2C specifically, at T=(0, 1), oversampled data 1, 1, 1, 0, 0, 0, 0, 1 yields phase transition data 101 after logic operations in HRPD 102. With reference to FIG. 2D specifically, at T=(1, 2), oversampled 1, 1, 1, 1, 0, 0, 0, 0 yield phase transition data 010 after logic operations in HRPD 102. With reference to FIG. 2E specifically, at T=(2, 3), oversampled data 0, 1, 1, 1, 1, 0, 0, 0 yield phase transition data 010 after logic operations in HRPD 102.

Figure 3A:
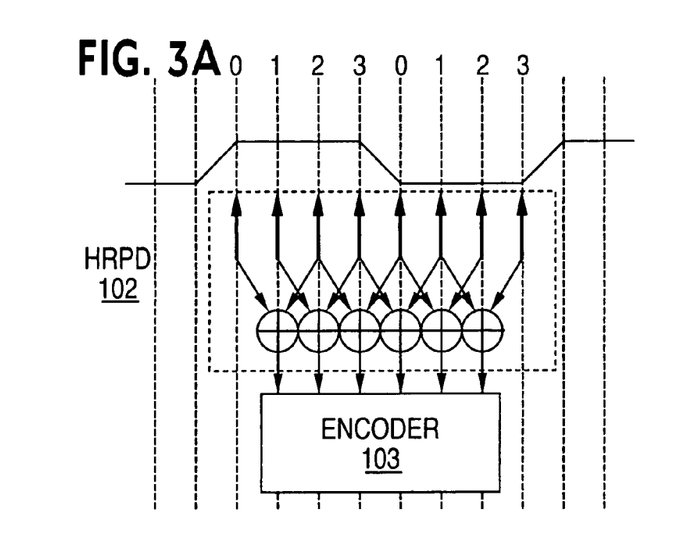
Figure 4A:
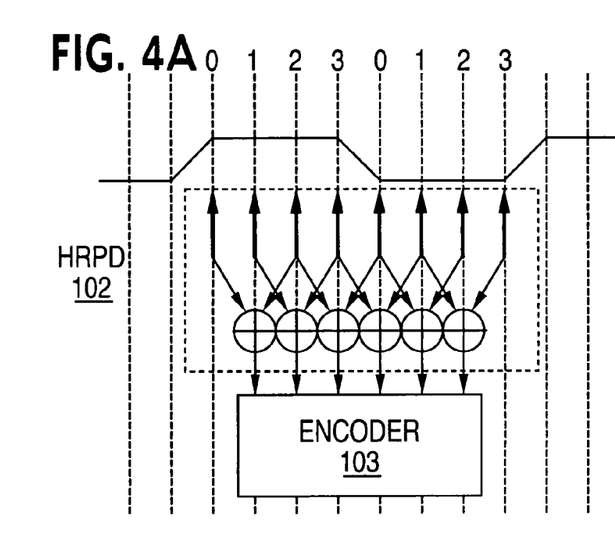

It is possible that the sampling will take place at non-transition phases. FIGS. 3A-3E and 4A-4E are diagrams that illustrate examples of 4× oversampling at non-transition phases.

Figure 3B:
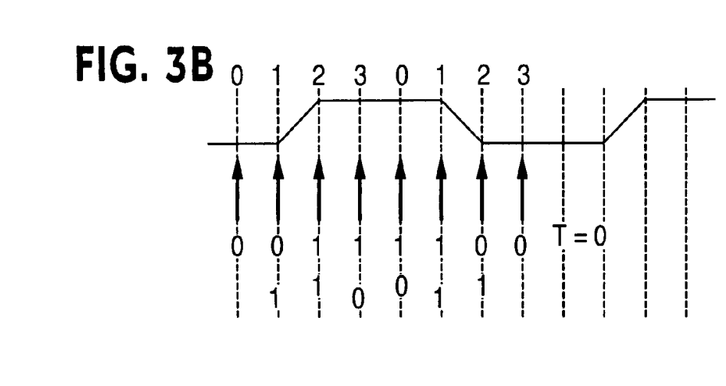
Figure 3C:
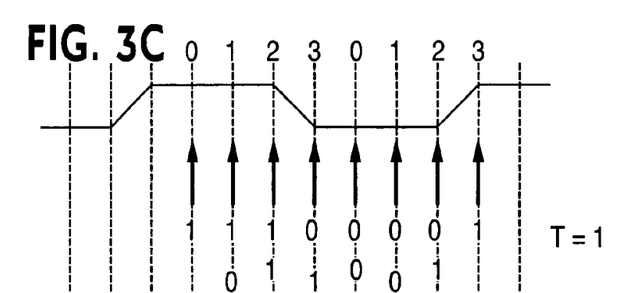
Figure 3D:
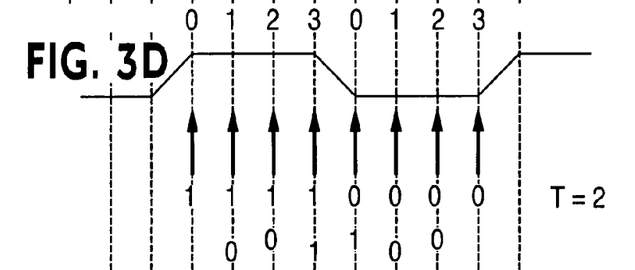
Figure 3E:
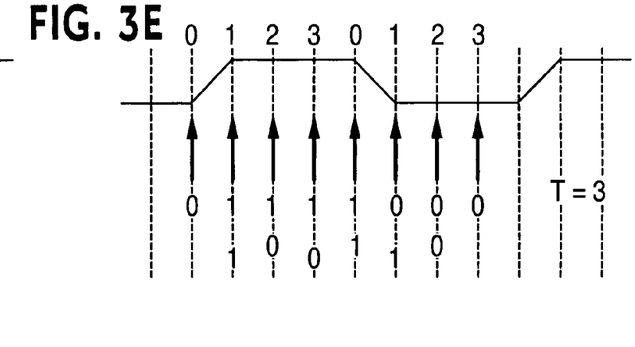

FIGS. 3A, 3B, 3C, 3D and 3E are diagrams that illustrate examples of 4× oversampling performed by HRPD 102 with the 8-phase clock. In this instance, the 4× oversampling takes place at non-transition phases. Referring to FIG. 3A specifically, the input data with the 8-phase clock will include samples at phases 0, 1, 2, 3, 0, 1, 2, 3, of two successive 4× oversamples, which are then subject to XOR logic operations in HRPD 102. Thus, two sets of oversampled data from HRPD 102 are output to encoder 103. With reference to FIG. 3B specifically, at (T=0), oversampled data 0, 0, 1, 1, 1, 1, 0, 0 will yield phase transition data 110011 after XOR logic operations in HRPD 102. With reference to FIG. 3C specifically, at (T=1), oversampled data 1, 1, 1, 0, 0, 0, 0, 1 will yield phase transition data 011001 after XOR logic operations in HRPD 102. With reference to FIG. 3D specifically, at (T=2), oversampled data 1, 1, 1, 1, 0, 0, 0, 0 will yield phase transition data 001100 after XOR logic operations in HRPD 102. With reference to FIG. 3E specifically, at (T=3), oversampled data 0, 1, 1, 1, 1, 0, 0, 0 will yield phase transition data 100110 after XOR logic operations in HRPD 102.

Figure 4B:
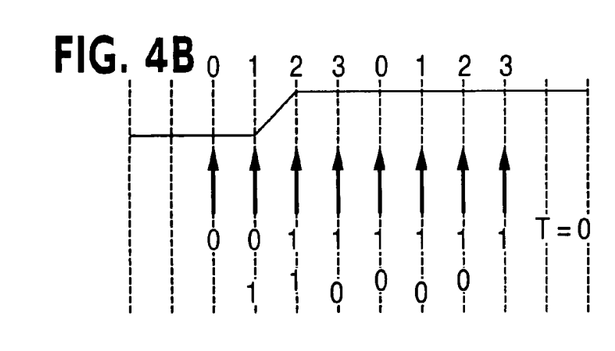
Figure 4C:
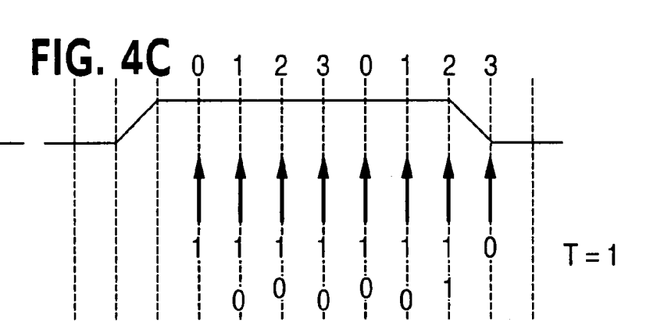
Figure 4D:
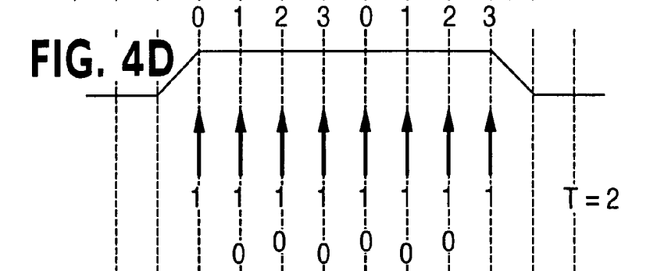
Figure 4E:
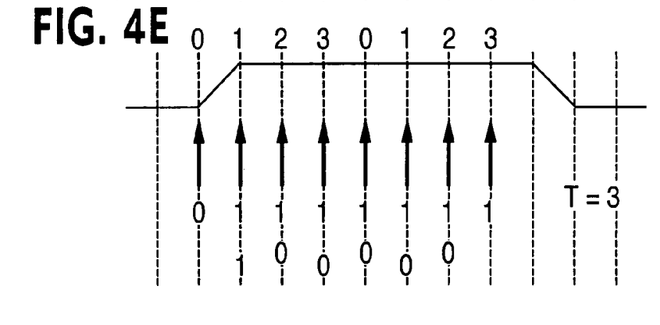

FIGS. 4A, 4B, 4C, 4D and 4E are diagrams that illustrate examples of 4× oversampling performed by HRPD 102 with the 8-phase clock, where the 4× oversampling takes place at non-transition phases. Referring to FIG. 4A specifically, the input data with the 8-phase clock will include samples at phases 0, 1, 2, 3, 0, 1, 2, 3, of two successive 4× oversamples, which are then subject to XOR logic operations in HRPD 102. Thus, two sets of oversampled data from HRPD 102 are output to encoder 103. With reference to FIG. 4B specifically, at (T=0), oversampled data 0, 0, 1, 1, 1, 1, 1, 1 will yield phase transition data 110000 after XOR logic operations in HRPD 102. With reference to FIG. 4C specifically, at (T=1), oversampled data 1, 1, 1, 1, 1, 1, 1, 0 will yield phase transition data 000001 after XOR logic operations in HRPD 102. With reference to FIG. 4D specifically, at (T=2), oversampled data 1, 1, 1, 1, 1, 1, 1, 1 will yield phase transition data 000000 after logic operations in HRPD 102. With reference to FIG. 4E specifically, at (T=3), oversampled data 0, 1, 1, 1, 1, 1, 1, 1 will yield phase transition data 100000 after XOR logic operations in HRPD 102.

Table 1, below, illustrates examples of the coding of the output of logic operations pertinent to the embodiments illustrated in FIGS. 3A-3E and 4A-4E, along with the corresponding optimum phase T.

TABLE 1

| Case | 1st Output | 2nd Output | Optimum T |
|---|---|---|---|
| FIG. 3B | 101 | 101 | 0 |
| FIG. 3C | 010 | 101 | 1 |
| FIG. 3D | 010 | 010 | 2 |
| FIG. 3E | 101 | 010 | 3 |
| FIG. 4B | 100 | 100 | 0 |
| FIG. 4C | 000 | 001 | 1 |
| FIG. 4D | 000 | 000 | 2 |
| FIG. 4E | 100 | 000 | 3 |

According to Table 1, for the 4× oversampling illustrated in FIGS. 3A-3E, the optimum phase T is 0 if the first output is 101 and the second output is 101, from the two sets of XOR logic operations on the two successive 4× oversamples, respectively. The optimum phase T is 1 if the first output is 010 and the second 101. The optimum phase T is 2 if the first output is 010 and the second 010. The optimum phase T is 3 if the first output is 101 and the second 010.

Further according to Table 1, for the 4× oversampling illustrated in FIGS. 4A-4E, the optimum phase T is 0 if the first output after the XOR logic operation is 100 and the second output is 100. The optimum phase T is 1 if the first output is 000 and the second output is 001. The optimum phase T is 2 if the first output is 000 and the second 000. The optimum phase T is 3 if the first output is 100 and the second 000.

Figure 5A:
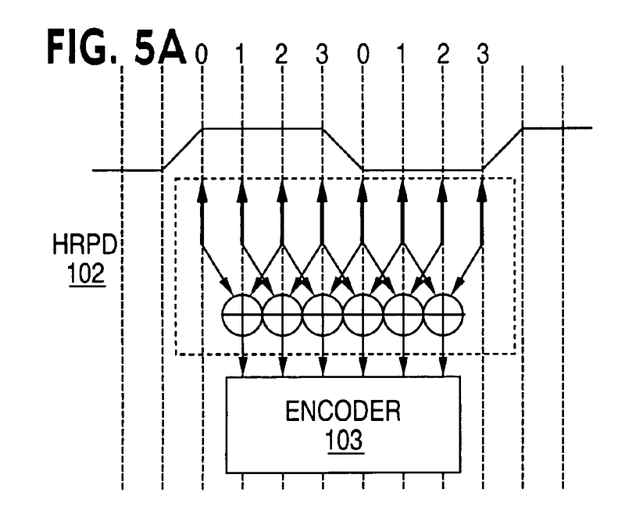
FIGS. 5 and 6 are diagrams that illustrate examples of oversampling at transition phases in accordance with additional embodiments of the present invention.
Figure 6A:
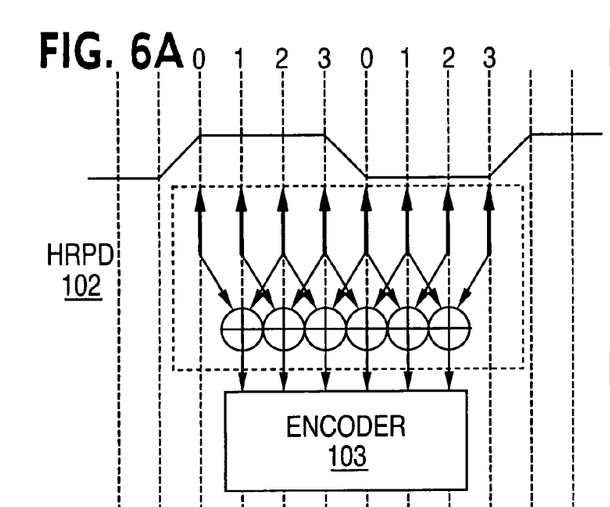

It is also possible that the sampling will take place at transition phases. FIGS. 5A-5E and 6A-6E are diagrams that illustrate examples of 4× oversampling at non-transition phases.

Figure 5B:
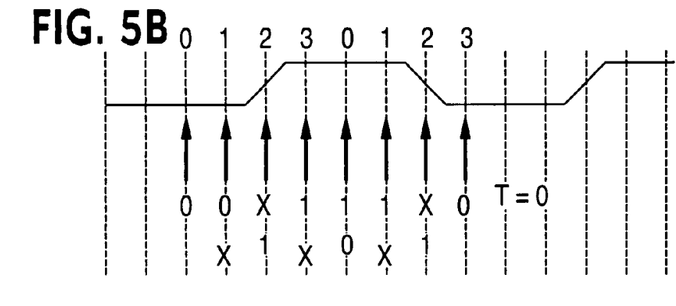
Figure 5C:
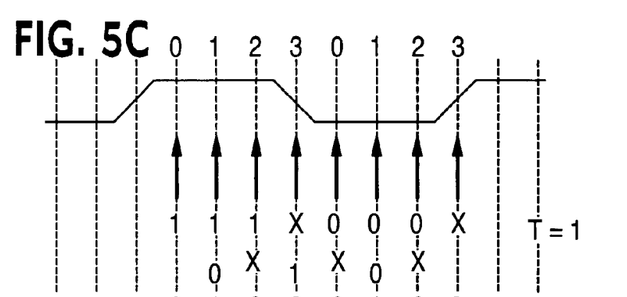
Figure 5D:
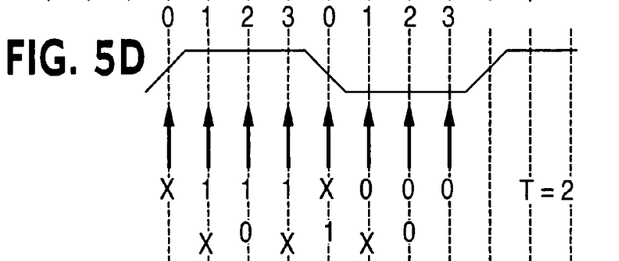
Figure 5E:
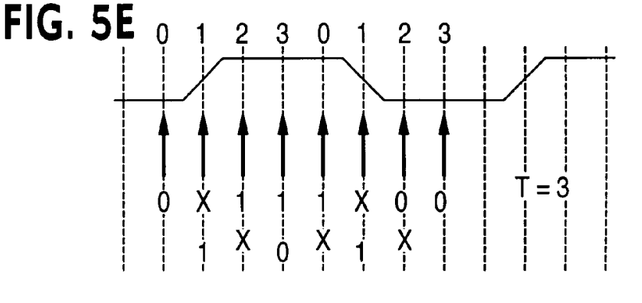

FIGS. 5A, 5B, 5C, 5D and 5E are diagrams that illustrate examples of 4× oversampling performed by HRPD 102 with the 8-phase clock. In this instance, the 4× oversampling takes place at transition phases. Referring to FIG. 5A, the input data with the 8-phase clock will include samples at phases 0, 1, 2, 3, 0, 1, 2, 3, of two successive 4× oversamples, which are then subject to XOR logic operations. Thus, two sets of oversampled data from HRPD 102 are output to encoder 103. With reference to FIG. 5B, at (T=0), oversampled data 0, 0, X, 1, 1, 1, X, 0 will yield phase transition data X1X0X1 after XOR logic operations, where X indicates null data because the sampling takes place at a transition. With reference to FIG. 5C, at (T=1), oversampled data 1, 1, 1, X, 0, 0, 0, X will yield phase transition data 0X1X0X after XOR logic operations. With reference to FIG. 5D, at (T=2), oversampled data X, 1, 1, 1, X, 0, 0, 0 will yield phase transition data X0X1X0 after logic operations. With reference to FIG. 5E, at (T=3), oversampled data 0, X, 1, 1, 1, X, 0, 0 will yield phase transition data 1X0X1X after XOR logic operations.

Figure 6B:
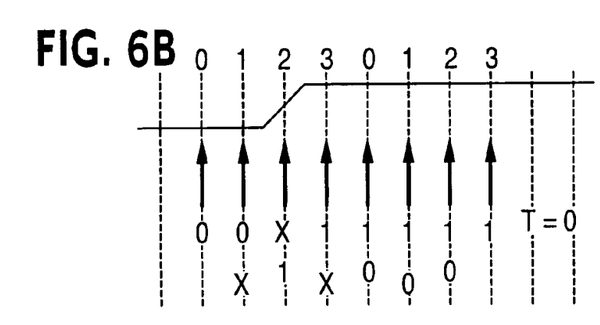
Figure 6C:
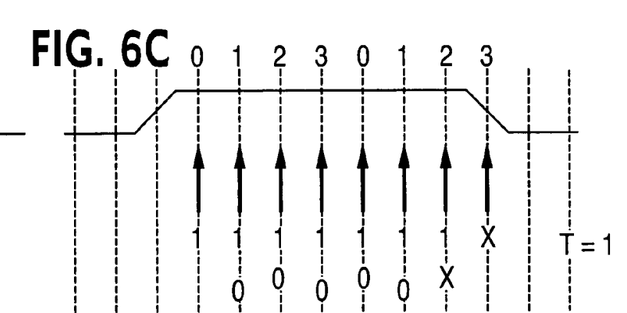
Figure 6D:
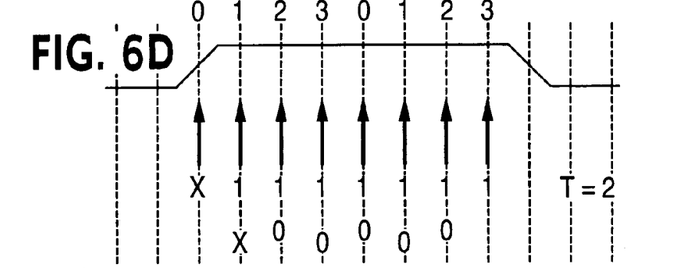
Figure 6E:
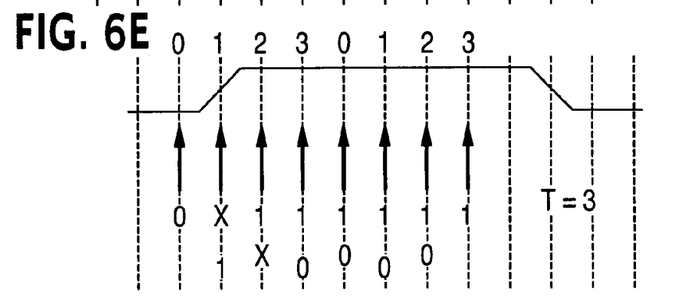

FIGS. 6A, 6B, 6C, 6D and 6E are diagrams that illustrate examples of 4× oversampling performed by HRPD 102 with the 8-phase clock, where the 4× oversampling takes place at transition phases. Referring to FIG. 6A, the input data with the 8-phase clock will include samples at phases 0, 1, 2, 3, 0, 1, 2, 3, which are then subject to XOR logic operations. Thus, two sets of oversampled data from HRPD 102 are output to encoder 103. With reference to FIG. 6B, at (T=0), oversampled data 0, 0, X, 1, 1, 1, 1, 1 will yield phase transition data X1X000 after XOR logic operations, where X indicates null data as the sampling takes place at transition. With reference to FIG. 6C, at (T=1), oversampled data 1, 1, 1, 1, 1, 1, 1, X will yield phase transition data 00000X after XOR logic operations. With reference to FIG. 6D, at (T=2), oversampled data X, 1, 1, 1, 1, 1, 1, 1 will yield phase transition data X00000 after XOR logic operations. With reference to FIG. 6E, at (T=3), oversampled data 0, X, 1, 1, 1, 1, 1, 1 will yield phase transition data 1X0000 after XOR logic operations.

Table 2, below, illustrates the coding of the output of logic operations pertinent to the embodiments illustrated in FIGS. 5A-5E and 6A-6E, along with the corresponding optimum phase T.

TABLE 2

| Case | 1st Output | 2nd Output | Optimum T |
|---|---|---|---|
| FIG. 5B | XXX | 101 | 0 |
| FIG. 5C | 010 | XXX | 1 |
| FIG. 5D | XXX | 010 | 2 |
| FIG. 5E | 101 | XXX | 3 |
| FIG. 6B | XX0 | 100 | 0 |
| FIG. 6C | 000 | 00X | 1 |
| FIG. 6D | X00 | 000 | 2 |
| FIG. 6E | 100 | X00 | 3 |

According to Table 2, for the 4× oversampling illustrated in FIGS. 5A-5E, the optimum phase T is 0 if the first output is XXX and the second output is 101, from the two sets of XOR logic operations on the two successive 4× oversamples, respectively. The optimum phase T is 1 if the first output is 010 and the second XXX. The optimum phase T is 2 if the first output is XXX and the second 010. The optimum phase T is 3 if the first output is 101 and the second XXX.

Further according to Table 2, for the 4× oversampling illustrated in FIGS. 6A-6E, the optimum phase T is 0 if the first output of the XOR logic operation is XX0 and the second output of another XOR logic operation is 100. The optimum phase T is 1 if the first output of the logic operations is 000 and the second 00X. The optimum phase T is 2 if the first output of the logic operation is X00 and the second is 000. The optimum phase T is 3 if the first output of the logic operation is 100 and the second is X00.

Encoder 103 encodes the phase transition data, with respect to the phase lead and lag between optimum and current sampling phases, and outputs the encoded phase data to confidence counter 105.

Figure 7:
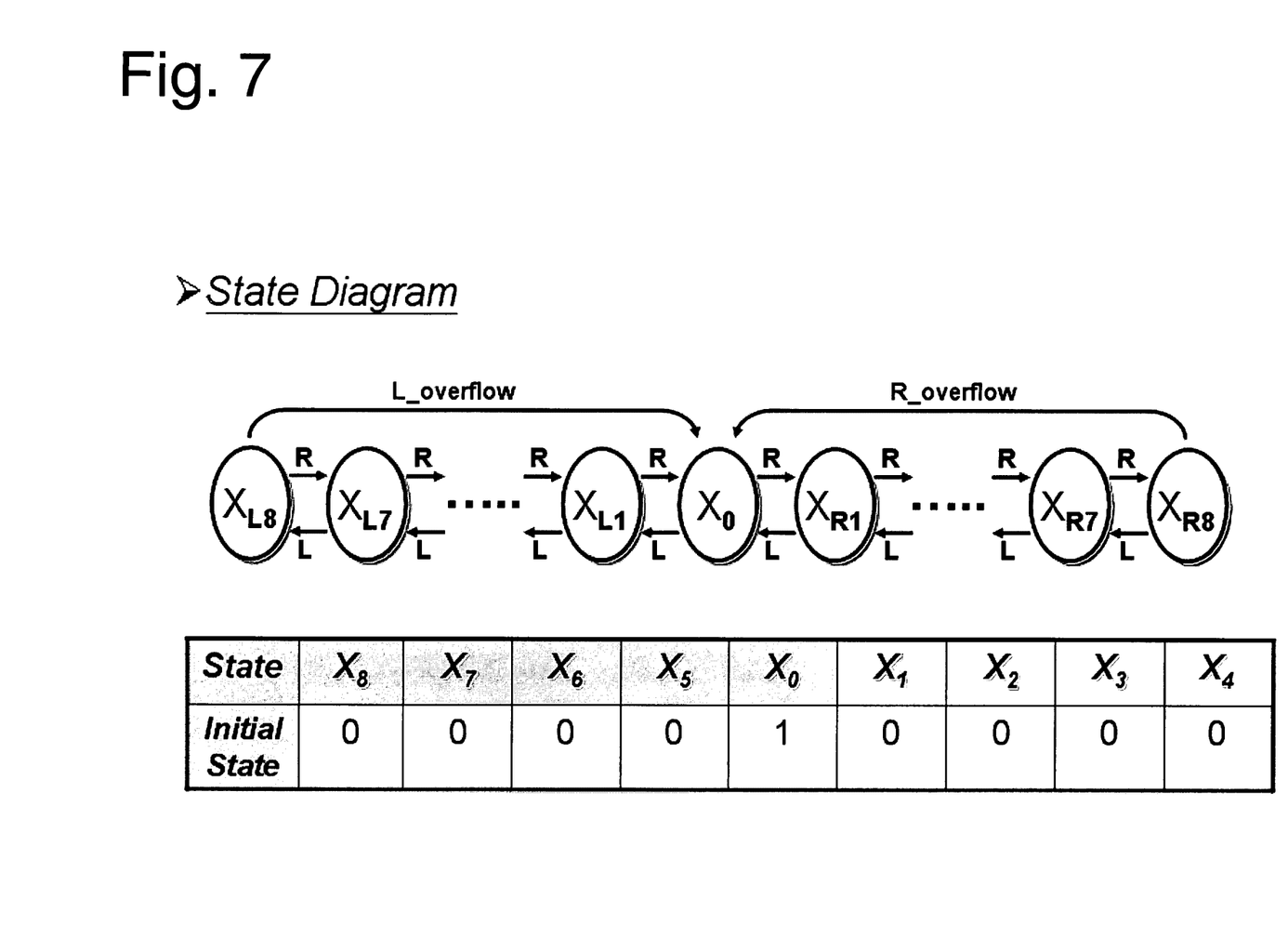
FIG. 7 is a state diagram that illustrates an example of logic operations at a confidence counter according to one embodiment of the present invention.

FIG. 7 is a state diagram that illustrates an example of XOR logic operations of confidence counter 105 according to one embodiment, where $X_0$ represents an initial state, L represents a phase lag, and R represents a phase lead. Initial state $X_0$ being the starting point, the state is shifted to $X_{R1}$ if a phase lead R is detected. The state is shifted to $X_{R2}$ if another phase lead R is detected. This shifting is repeatedly performed for all subsequent detections of phase leads until the state is shifted to $X_{R8}$. If another phase lead R is detected at $X_{R8}$, R overflow is indicated and the state is shifted back to the initial state $X_0$. In the reverse direction, the state is shifted from $X_{R8}$ to $X_{R7}$ if a phase lag L is detected. This reverse shifting is repeatedly performed for all subsequent detections of phase lags until the state is shifted back to the initial state $X_0$.

Similarly, with the initial state $X_0$ as the starting point, the state is shifted to $X_{L1}$ if a phase lag L is detected. The state is shifted to $X_{L2}$ if another phase lag L is detected. This shifting is repeatedly performed for all subsequent detections of phase lags until the state is shifted to $X_{L8}$. If another phase lag L is detected at $X_{L8}$, L overflow is indicated and the state is shifted back to the initial state $X_0$. In the reverse direction, the state is shifted from $X_{L8}$ to $X_{L7}$ if a phase lead R is detected. This reverse shifting is repeatedly performed for all subsequent detections of phase leads until the state is shifted back to the initial state $X_0$.

Figure 8:
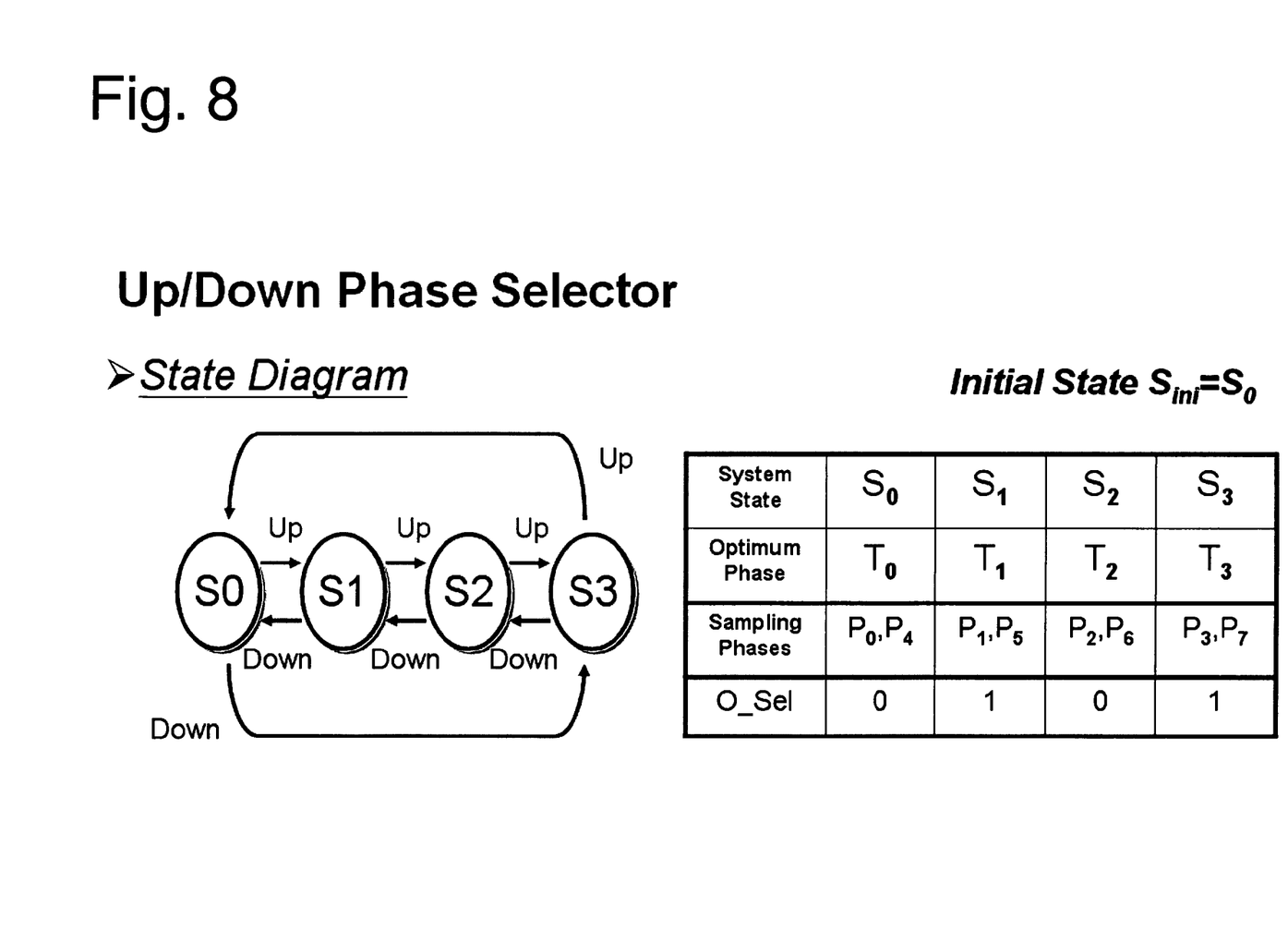
FIG. 8 is a state diagram that illustrates an example of logic operations at an optimum phase selector according to one embodiment of the present invention.

Phase selector 104 takes the results of the logic operations from confidence counter 105 and determines the optimum phase for sampling from a plurality of sampling phases. FIG. 8 is a state diagram that illustrates an example of logic operations of phase selector 104 according to one embodiment. States $S_0$, $S_1$, $S_2$ and $S_3$ represent the four system states with respect to the optimum phases $T_0$, $T_1$, $T_2$ and $T_3$. The optimum phases $T_0$, $T_1$, $T_2$, $T_3$ respectively correspond to sampling phases $(P_0, P_4)$, $(P_1, P_5)$, $(P_2, P_6)$, $(P_3, P_7)$, which in turn correspond to selection data 0, 1, 0, 1. One of the two outputs from HRPD 102 is selected as the control signal. Starting from the initial state $S_0$, for a transition up received from confidence counter 105, the state $S_0$ is shifted to $S_1$. This shifting is repeatedly performed for each transition up received from confidence counter 105 until the state is shifted to state $S_3$. For transition up at $S_3$, the state is shifted back to the initial state $S_0$. Starting from state $S_3$, for transition down received from confidence counter 105, the state $S_3$ is shifted to $S_2$. This back shifting is repeatedly performed for each transition down received from confidence counter 105 until the state is shifted to the initial state $S_0$. For transition down at the initial state $S_0$, the state is shifted back to state $S_3$.

Table 3, below, illustrates exemplary operations of encoder 103 based on the phase lead and lag data for output to confidence counter 105 pertinent to the embodiment illustrated in FIG. 8 in further view of embodiments illustrated in conjunction with Tables 1 and 2.

TABLE 3

| State | Output Selected 1st or 2nd (O_sel) | Phase Lead | Phase Lag |
|---|---|---|---|
| $S_0$ | 1st (0) | 010, 000 | 101, 100 |
| $S_1$ | 2nd (1) | 010, 000 | 101, 100 |
| $S_2$ | 1st (0) | 101, 100 | 010, 000 |
| $S_3$ | 2nd (1) | 101, 100 | 010, 000 |

Starting with the initial state $S_0$, encoder 103 takes the output from HRPD 102 and compares it with the phase lead and lag values in Table 3. At the initial state $S_0$, e.g., if the output from HRPD 102 happens to coincide with the phase lead value 010 in Table 3, encoder 103 outputs (lead=1, lag=0) to confidence counter 105. Conversely, if the output from HRPD 102 happens to be 100, coinciding with the phase lag value 100 in Table 3, encoder 103 outputs (lead=0, lag=1) to confidence counter 105. If the output from HRPD 102 does not match any of the phase lead and lag values in Table 3, encoder 103 outputs (lead=0, lag=0) to confidence counter 105. The same is repeated for the other three states $S_1$, $S_2$ and $S_3$.

By way of example, if the initial sampling phase is $T_0$, and the optimum phase is $T_2$, confidence counter 105 takes a first output from encoder 103 and performs the XOR logic operations, e.g., according to the state diagram illustrated in FIG. 7. When an overflow (e.g., transition up) occurs, the sampling phase is shifted to $T_1$ for sampling a second output from encoder 103. This is repeatedly performed until the optimum phase is shifted, for example, to between $T_2$ and $T_1$, or between $T_2$ and $T_3$, where the optimum phase is then locked accordingly.

In view of Tables 1 and 2, the first and second outputs from XOR logic operations will reach the same results, even when the sampling returns uncertain values (represented by X), e.g., sampled data between 1 and 0. The accumulative effect of confidence counter 105 results in properly approaching the optimum phase when there is an overflow (lead or lag) in the confidence counter. That is, "overflow" is used to describe the case where at state $X_{R8}$ another phase lead R is received, at which point the state shifts back to $X_0$ in a transition up. Accordingly, the sampling phase will be adjusted upwards in approximating the optimum phase. Conversely, "overflow" is used to describe the case where at state $X_{L8}$ another phase lag is received, at which point the state shifts back to $X_0$ in a transition down. Accordingly, the sampling phase will be adjusted downwards in approximating the optimum phase. This advantageously minimizes undesirable data and frequency oscillation effects and, consequently, the bit error rate (BER) and acquisition time.

Figure 9:
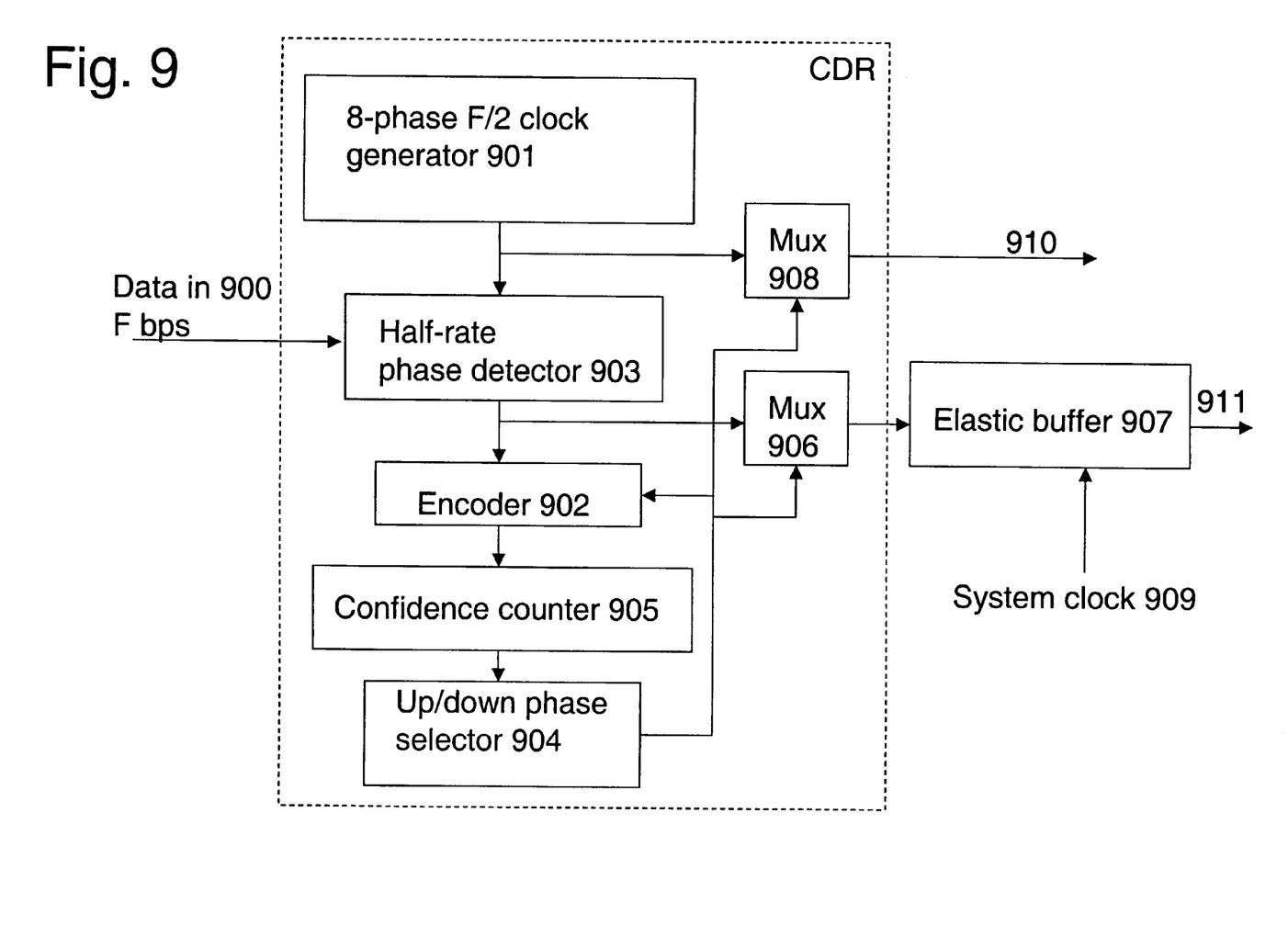
FIG. 9 is a block diagram that illustrates an example of a system according to a further embodiment of the present invention.

FIG. 9 is a block diagram of a system for clock and data recovery ("CDR") according to a further embodiment of the present invention. The system in FIG. 9, which is a variation of the system shown in FIG. 1, comprises input data 900, a clock generator 901, an encoder 902, a half-rate phase detector 903, a phase selector 904 outputting a recovered clock signal 910 through a multiplexer (Mux 908), a confidence counter 905, and another multiplexer 906 outputting recovered data 911 through an elastic buffer 907.

Based on a system clock 909, clock generator 901 generates an 8-phase clock signal at half the rate of the input data 900 for data transmitted over a serial link. System clock 909 can be supplied externally. A phase locked loop ("PLL") or delay lock loop ("DLL") device can serve as an 8-phase clock of clock generator 901. A crystal oscillator, e.g., can supply the clock signal to the PLL. Based on the half-rate, the 8-phase clock generated by clock generator 901, encoder 902 encodes input data 900 at four times a standard sampling rate (i.e., 4× oversampling). For 4× oversampling, a single bit of input data 900 is encoded at four different temporal points within that bit. Half-rate phase detector 903 receives the input data 900 and detects phase transitions therein, i.e., phase lead and lag, and outputs corresponding phase transition data to encoder 902. Confidence counter 905 receives the phase transition data and generates a signal representing the accumulated net effect of the phase lead and lag transitions. Phase selector 904 receives the signal generated by confidence counter 905, along with the 8-phase clock from clock generator 901 (connection not shown in FIG. 9), and determines the optimum phase for data sampling. Phase selector 904 outputs the recovered clock signal 910, through Mux 908, based on the optimum clock signal phase for the data sampling. Mux 906 also receives the output from phase selector 904 and the encoded data from encoder 902 (connection not shown in FIG. 9) and outputs recovered data 911.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

We claim:

1. A system comprising:
   a clock for generating a clock signal at half a rate of transmitted serial data from a signal source;
   a half-rate phase detector coupled to the clock and the signal source for oversampling the transmitted serial data and providing sampled data, and for detecting and grouping phase transitions between a phase lead and a phase lag in the sampled data and outputting phase transition data;

a phase selector;

an encoder, coupled to the half-rate phase detector, for encoding the phase transition data according to an optimum phase selected by the phase selector; and a confidence counter coupled to the encoder to receive the encoded phase transition data and provide an output representative of an accumulated effect of the phase transitions based on the encoded phase transition data, wherein the phase selector is coupled to receive the clock signal and the output from the confidence counter to select the optimum phase effective for recovering the clock relative to the transmitted serial data, and the phase detector provides to the encoder one set of oversampled data while oversampling at transition phases of the transmitted serial data and provides to the encoder two sets of oversampled data while oversampling at non-transition phases of the transmitted serial data.

2. The system of claim 1, wherein the phase detector oversamples the transmitted serial data at four times the half rate of the transmitted serial data.

3. The system of claim 1, wherein the clock signal has eight phases for each period in the transmitted serial data.

4. The system of claim 1, wherein the clock comprises a delay locked loop.

5. The system of claim 1, wherein the clock comprises a phase locked loop.

6. The system of claim 1, wherein the confidence counter comprises a state machine for identifying each of the detected phase leads and the detected phase lags.

7. The system of claim 6, wherein the state machine further comprises an initial state, eight states for each detection of the phase lead, and eight states for each detection of the phase lag.

8. The system of claim 1, wherein the phase selector comprises a state machine having four states for shifting the sampling phase toward the optimum phase.

9. The system of claim 1, wherein the phase detector performs XOR logic operations.

10. The system of claim 9, wherein input data in the XOR logic gate have a phase transition rate twice of phase resolution of the phase detector.

11. The system of claim 9, wherein XOR logic operation results are grouped into two sets according to sampled clock phases.

12. The system of claim 9, wherein the encoder encodes output data of the phase detector according to the optimum phase of the phase selector.

13. The system of claim 1 further comprising a multiplexer coupled to receive the recovered clock and the oversampled data and output the transmitted data.

14. A clock and data recovery method comprising:
generating a clock signal at half a rate of transmitted serial data;
oversampling the transmitted serial data and providing sampled data;
detecting and grouping phase transitions between a phase lead and a phase lag in the sampled data and outputting phase transition data;
encoding the phase transition data according to an optimum phase selected by a phase selector;
providing an output representative of an accumulated effect of the encoded phase transitions based on the encoded phase transition data; and
selecting the optimum phase effective for recovering the clock relative to the transmitted serial data,
wherein the sampled data includes one set of oversampled data while oversampling at transition phases of the transmitted serial data and two sets of oversampled data while oversampling at non-transition phases of the transmitted serial data.

15. The method of claim 14 further comprising oversampling the transmitted serial data at four times the half rate with respect to the clock signal for each period of the transmitted serial data.

16. The method of claim 14, wherein the clock signal comprises eight phases.

17. The method of claim 14 further comprising multiplexing the recovered clock and the oversampled data for outputting the transmitted serial data.

18. The method of claim 14 further comprising performing logic operations in selecting the optimum phase.

19. A system comprising:
a clock for generating an 8-phase clock signal at half rate of transmitted serial data;
a half-rate phase detector for oversampling the transmitted serial data at four times the half clock rate and providing sampled data, and for detecting and grouping phase transitions between a phase lead and a phase lag in the sampled data and outputting phase transition data;
a phase selector;
an encoder encoding the phase transition data according to an optimum phase selected by the phase selector; and
a confidence counter coupled to receive the encoded phase transition data and provide an output representative of an accumulated effect of the phase transitions,
wherein the phase selector is coupled to receive the clock signal and the output from the confidence counter to select the optimum phase effective for recovering the clock relative to the transmitted serial data, and the phase detector provides to the encoder one set of oversampled data while oversampling at transition phases of the transmitted serial data and provides to the encoder two sets of oversampled data while oversampling at non-transition phases of the transmitted serial data.

20. The system of claim 19, wherein the confidence counter comprises a state machine for identifying each of the detected phase leads and the detected phase lags.

21. The system of claim 20, wherein the state machine further comprises an initial state, eight states for each detection of the phase lead, and eight states for each detection of the phase lag.

22. The system of claim 19, wherein the phase selector comprises a state machine having four states for shifting the sampling phase toward the optimum phase.

23. The system of claim 19 further comprising a multiplexer coupled to receive the recovered clock and the oversampled data and output the transmitted data.

* * * * *